United States Patent [19]

Hiyama et al.

[11] Patent Number: 4,910,449

[45] Date of Patent: Mar. 20, 1990

[54] SYSTEM FOR PREVENTING UNBALANCE VIBRATIONS AND SYNCHRONOUS DISTURBANCE VIBRATIONS

[75] Inventors: Hirokuni Hiyama, Fujisawa; Katsuhide Watanabe, Kawasaki, both of Japan

[73] Assignees: Ebara Corporation, Ohta; Ebara Research Co., Ltd., Fujisawa, both of Japan

[21] Appl. No.: 195,051

[22] Filed: May 17, 1988

[30] Foreign Application Priority Data

May 18, 1987 [JP] Japan .................... 62-122209

[51] Int. Cl.$^4$ ............................................. G05D 15/00
[52] U.S. Cl. ................................. 318/640; 318/625; 318/629; 318/630; 318/632; 310/90.5
[58] Field of Search ........ 318/661, 687, 607, 628–648, 318/653; 310/90.5

[56] References Cited

U.S. PATENT DOCUMENTS

| | | | |
|---|---|---|---|
| 3,886,871 | 6/1975 | Ross et al. ................. | 318/687 X |
| 4,121,143 | 10/1978 | Haberman et al. . | |
| 4,626,754 | 12/1986 | Habermann et al. ........ | 318/661 X |
| 4,686,404 | 8/1987 | Nakazeki et al. ............ | 318/629 X |
| 4,697,128 | 9/1987 | Matsushita et al. ......... | 318/607 |

FOREIGN PATENT DOCUMENTS

| | | |
|---|---|---|
| 0156730 | 10/1985 | European Pat. Off. . |
| 0157693 | 10/1985 | European Pat. Off. . |
| 3120691 | 12/1982 | Fed. Rep. of Germany . |

*Primary Examiner*—William M. Shoop, Jr.
*Assistant Examiner*—Paul Ip
*Attorney, Agent, or Firm*—Armstrong, Nikaido, Marmelstein, Kubovcik & Murray

[57] ABSTRACT

A rotation control system for preventing unbalance vibrations and synchronous disturbance vibrations of a rotary member suspended by a magnetic bearing. This system includes a vibration detector which detects radial vibration of the rotary member. On the basis of the detected radial vibration, a compensating signal which has the same amplitude and cycle as the vibration component having the rotational frequency is generated. The difference between the detected vibration and the compensating signal is obtained and used for controlling the radial position of the magnetic bearing.

7 Claims, 1 Drawing Sheet

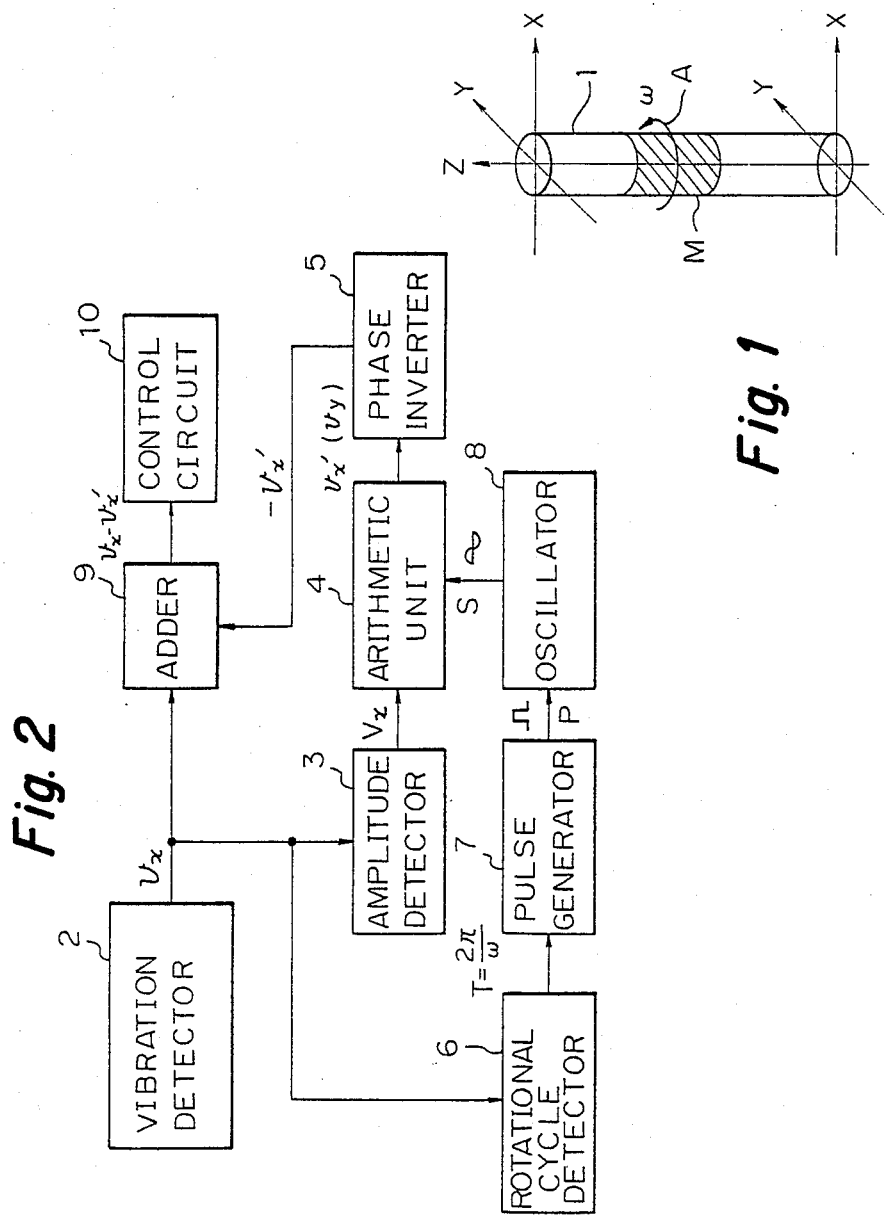

SYSTEM FOR PREVENTING UNBALANCE VIBRATIONS AND SYNCHRONOUS DISTURBANCE VIBRATIONS

BACKGROUND OF THE INVENTION

1. Field of the Invention:

The present invention relates to a system for preventing unbalance vibrations and synchronous disturbance vibrations in a rotation control system for controlling the radial position of a rotary member suspended by an active magnetic bearing.

2. Description of the Prior Art:

With respect to vibrations of a rotary member in a rotor system radially suspended by an active magnetic bearing, a component responding to any unbalance vibration attributable to residual unbalance is maximum disturbance with respect to unstable vibrations of the rotor system. This unbalance vibration causes an increase in magnitude of vibrations in the vicinity of the natural vibration frequency; and vibration of a structure is provoked when the unbalance vibration synchronizes with the resonance point of the structure. Furthermore, when vibration generating forces are imparted to a stator mounted on a fixing member of a magnetic bearing, vibration of the casing increases. This results in unfavorable effects in terms of unnecessary consumption of electric power and wasteful generation of heat.

An active magnetic bearing typically serves to control a rotary member so that the latter rotates about the geometrical center thereof. The magnetic bearing has, however, three centers, i.e., the geometrical center, the magnetic center and the inertial center of the rotary member. It is difficult to make these centers coincide with one another.

In order to diminish the degree of deviation between each of these centers, efforts are made to provide ordinary dynamic balance and field balance. It is, however, almost impossible to completely eliminate the unbalance which remains in the rotary member. Efforts to eliminate a larger amount of unbalance than is ordinary necessary would result in greater costs.

The surface of a rotary machine becomes corroded and contaminated due to the action of fluid flowing in the rotary machine during its operation and this augments the degree of unbalance. Moreover, an extremely large and abrupt unbalance will occur at the time of such eventualities as blade damage.

Thus, some unbalance inevitably remains in the process of manufacturing a rotary machine, and also some unbalance is newly produced during operation of the rotary machine. A technique capable of reducing adverse influences exerted on a rotary machine due to this unbalance is required in view of the need to improve safety and working conditions in respect of such machines. For this purpose, the rotor should be arranged to rotate about the inertial center so that the vibration caused by any unbalance is decreased.

SUMMARY OF THE INVENTION

Accordingly, it is a primary object of the present invention to provide means for obviating the above-described defects.

It is another object of the present invention to provide a rotation control system which operates such that a rotary member rotates about the inertial center at all times.

It is another object of the present invention to provide a system for preventing any unbalance vibration or synchronous disturbance vibration in a rotation control system which causes a rotary member suspended by an active magnetic bearing to rotate about the inertial center, making control effected at the rotary frequency insensitive.

To accomplish the above-described objects, according to the present invention, a vibration detecting signal is obtained by detecting a vibration in the direction perpendicular to the rotary axis of a rotary member suspended by an active magnetic bearing. Based on this vibration detecting signal, both the amplitude and cycle of the vibration component having the rotational frequency in the detected vibration of the rotary member are detected. In accordance with the thus detected amplitude and cycle, a compensating signal which has the same amplitude and cycle as and synchronizes with the above-mentioned vibration component is generated. Subsequently, a signal representing the difference between the vibration detecting signal and the compensating signal is obtained. This difference signal is transmitted to the control unit.

More specifically, a rotation control system according to the present invention comprises: a vibration detector for detecting displacement of a rotary member in the direction perpendicular to the rotary axis of the rotary member; an amplitude detector for detecting the amplitude of a vibration component having the rotational frequency, the main component of the vibration, from the output of the vibration detector; a rotational cycle detector for detecting the cycle of the vibration component from the output of the vibration detector; a pulse generator for generating pulses which have the same cycle as and synchronize with the vibration component from the output of the rotational cycle detector; an oscillator for outputting a sine wave signal which has the same cycle as and synchronizes with the output pulses of the pulse generator; an arithmetic unit which receives the amplitude of the vibration component detected by the amplitude detector and the sine wave signal outputted from the oscillator and outputs a compensating signal which has the same cycle and amplitude as the vibration component having the rotational frequency; a phase inverter for inverting the phase of the compensating signal; and an adder for adding the inverted compensating signal to the output of the vibration detector. The output of the adder is a signal obtained by subtracting the signal which has the same cycle and amplitude as the vibration component having the rotational frequency from the output signal of the vibration detector, the thus obtained signal being input to a control circuit.

As described above, the output signal of the phase inverter is a signal obtained by inverting the phase of a signal which has the same cycle and amplitude as the vibration component having the rotational frequency obtained by the output of the arithmetic unit. Hence, it follows that the output signal of the adder which adds this signal to the output signal of the vibration detector is a signal having no so-called unbalance vibration component and no synchronous disturbance vibration component, that is, a signal obtained by eliminating the vibration component having the rotational frequency from the vibration of the rotary member detected by the vibration detector.

It is therefore possible to effectively eliminate any unbalance that remains in the process of manufacturing a rotary machine or any unbalance created during the operation thereof and to perform operations without generating any vibration of a structure during the rotation of the rotary member of a rotary system. This offers excellent advantages in terms of the fact that only a small amount of vibration is produced during rotation even if the system is in a roughly-balanced state. Moreover, a lower quantity of control current is consumed than in the prior art.

Many other features, advantages and additional objects of the present invention will become apparent to one skilled in the art upon making reference to the following detailed description and accompanying drawings.

BRIEF DESCRIPTION OF THE DRAWINGS

FIG. 1 illustrates one example of a rotary member, the radial position of which is to be controlled; and FIG. 2 shows a block diagram illustrating the constitution of one embodiment of a system for preventing unbalance vibrations and synchronous disturbance vibrations according to the present invention.

DETAILED DESCRIPTION OF THE PREFERRED EMBODIMENTS

One embodiment of the present invention will be described below with reference to FIGS. 1 and 2.

Referring to FIG. 1, illustrated is a view of one example of a rotary member the radial position of which is to be controlled. As shown in FIG. 1, the rotary member 1 includes a motor M at its central portion. The rotary member 1 is rotated by the motor M at the rotational frequency $\omega$ in the direction indicated by an arrow A. At both ends of the rotary member 1 control axes, viz., axes X and Y spaced from each other at 90° are set on a plane XY perpendicular to the rotary axis Z thereof. Namely, two control axes are disposed at each end of the rotary member 1 equipped at its center with the motor M, and thus four control axes exist.

The description will next be focused on a rotation control system for preventing unbalance vibrations and synchronous disturbance vibrations according to the present invention. It is to be noted that such a rotation control system should be disposed on each of four control axes of the rotary member 1. FIG. 2 is a block diagram depicting a rotation control system of the present invention which is disposed on the upper X-axis to prevent any unbalance vibrations and synchronous disturbance vibrations in the direction of the axis X.

The vibration detector 2 operates to detect a vibration $v_x$ in the direction of the axis X of the rotary member 1 and supply a corresponding output signal, a vibration detecting signal, to an amplitude detector 3, a rotational cycle detector 6 and an adder 9.

The amplitude detector 3 serves to detect an amplitude $v_x$ of the vibration component having the relevent rotational frequency, the main component of the vibration $v_{x'}$, and output a signal corresponding to the detected amplitude $V_x$ to an arithmetic unit 4. The rotational cycle detector 6 detects a cycle T ($T = 2\pi/\omega$) of the vibration $v_x$ and then outputs a signal corresponding to a detected cycle T to a pulse generator 7. The pulse generator 7 generates pulses P which are of the same cycle as and are synchronized with the cycle T detected by the rotational cycle detector 6, and supplies an oscillator 8 with the pulses P. The oscillator 8 generates, using the pulses P as a reference signal, a sine wave signal S ($S = \sin \omega t$) which is of the same cycle as and synchronizes with the pulses P, and then supplies the arithmetic unit 4 with the sine wave signal S. On the basis of the sine wave signal S transmitted from the oscillator 8 and the signal showing the amplitude $V_x$ detected by the amplitude detector 3, the arithmetic unit 4 performs an operation to generate a signal $v_{x'}$ ($v_{x'} = V_x \sin \omega t$) which has the same cycle and amplitude as and synchronizes with the vibration component having the rotational frequency, and supplies the signal $v_{x'}$ to a phase inverter 5. The phase of the signal $v_{x'}$ is inverted by the phase inverter 5, and a signal $(-v_{x'})$ is applied to the adder 9.

The adder 9 adds the signal $(-v_{x'})$ output from the phase inverter 5 and the vibration detecting signal $v_x$ of the rotary member 1 which is detected by the vibration detector 2, thus obtaining a difference signal $(v_x - v_{x'})$ between the vibration $v_x$ of the rotary member 1 and the rotational frequency vibration component $v_{x'}$. This signal $(v_x - v_{x'})$ is inputted as one input to a control circuit 10 which controls a current flowing in a coil of the active magnetic bearing.

Other rotation control systems are provided in order to prevent unbalance vibrations and synchronous disturbance vibrations of the rotary member 1 in the direction of the remaining control axes. The construction of such rotation control systems are identical with that described above with reference to FIG. 2, and hence description thereof is omitted herein.

By virtue of the above-described constitution, the difference signals $(v_x - v_{x'})$ and $(v_y - v_{y'})$ are output from the adders of the rotation control systems provided with respect to the respective control axes X and Y, and are then applied to the control circuit 10. These signals are formed in such a manner that only the vibration component having the rotational frequency is removed from the vibration detecting signal which is detected by the vibration detector 2. Thus these signals include no unbalance vibrations and no synchronous disturbance vibrations. That is, a circuit comprising the amplitude detector 3, the arithmetic unit 4, the phase inverter 5, the rotational cycle detector 6 and the oscillator 8 are combined to constitute compensating signal generating means for generating a compensating signal having the same cycle and amplitude as the vibration component having the rotational frequency on the basis of the vibration $v_x$ or $v_y$ which is output from the vibration detector 2. It is therefore possible to prevent unbalance vibration and synchronous and disturbance vibration of the rotary member 1 by causing the difference signals $(v_x - v_{x'})$ and $(v_y - v_{y'})$ which are free of the unbalance vibration and synchronous disturbance vibration to serve as the feedback inputs supplied to the control circuit 10.

In short, the present invention is characterized by a construction having a compensating signal generating circuit for generating a compensating signal having the same cycle and amplitude as the vibration component having the relevant rotational frequency on the basis of an output signal, a vibration detecting signal, of a vibration detector for detecting the radial vibration of the rotary member 1. A signal is obtained representing the difference between the vibration detecting signal detected by the vibration detector and the compensating signal in order to remove the unbalance vibration component and the synchronous disturbance vibration component. Then, the signal which does not include any unbalance vibration component and the synchronous disturbance vibration component is fed back to the rotation control circuit. The present invention is not, however, intended to be limited in its constitution to that depicted in FIG. 2. It is to be understood that a variety of changes or modifications may be effected by one skilled in the art without departing from the scope and the spirit of the invention. For instance, the circuit illustrated in FIG. 2 is disposed on each of the control axes X and Y and the compensating signals are output from the individual phase inverters. Instead, the rotation control circuits for the Y-axes may be omitted, and the circuit of FIG. 2 is provided only on each X-axis. From the amplitude $V_x$ detected by the amplitude detector 3, the inverted vibration component $(-v_y')$ is in this case obtained by the following equation:

$$-v_y' = -V_x \sin(t - \pi/2)$$

Then, this compensating signal $(-v_y')$ is added to the vibration $v_y$ to obtain the signal $(v_y = v_y')$.

What is claimed is:

1. A rotation control system for controlling the radial position of a rotary member suspended by an active magnetic bearing comprising:
   first means for detecting radial vibration of said rotary member to output a vibration detecting signal corresponding to the vibration;
   second means for generating a signal obtained by eliminating an unbalance vibration component and synchronous disturbance vibration component of said rotary member from said vibration detecting signal comprising signal generating means for generating a compensating signal on the basis of said vibration detecting signal including:
   means for detecting the amplitude of said vibration detecting signal to generate a first signal corresponding to the detected amplitude,
   means for detecting the cycle of said vibration detecting signal to generate a second signal corresponding to the detected cycle, and
   oscillator means responsive to said first and second signals for generating said compensating signal, which has the same cycle and amplitude as a vibration component having the rotational frequency of said vibration of detecting signal;
   signal producing means for producing a difference signal representing the difference between said vibration detection signal and said compensating signal; and
   third means responsive to said difference signal generated by said second means for controlling the radial position of said rotary member.

2. A control system as set forth in claim 1, wherein said second means comprises:
   signal generating means for generating a compensating signal on the basis of said vibration detecting signal, said compensating signal having the same cycle and amplitude as the vibration component having the rotational frequency in said vibration detecting signal; and
   signal producing means for producing a difference signal representing the difference between said vibration detecting signal and said compensating signal.

3. A control system as set forth in claim 2, wherein said signal generating means includes:
   means for detecting the amplitude of said vibration detecting signal to generate first signal corresponding to the detected amplitude;
   means for detecting the cycle of said vibration detecting signal to generate a second signal corresponding to the detected cycle; and
   means responsive to said first and second signals for generating a compensating signal which has the same cycle and amplitude as and synchronizes with said vibration component having the rotational frequency in said vibration detecting signal.

4. A control system as set forth in claim 1, wherein said means for detecting the cycle includes:
   a rotational cycle detector responsive to said vibration detecting signal for detecting the cycle of the vibration of said rotary member;
   a pulse generator for generating pulses which have the same cycle as and synchronize with the cycle detected by said rotational cycle detector; and
   an oscillator which receives said pulses for generating said second signal which has the same cycle as and synchronizes with said pulses, said second signal being a sine wave signal.

5. A control system as set forth in claim 1, wherein said compensating signal generating means includes:
   an arithmetic unit responsive to said first and second signals to output a third signal which has the same cycle as and synchronizes with the rotational frequency; and
   a phase inverter for inverting the phase of said third signal to output the compensating signal.

6. A control system for controlling the radial position of a rotary member suspended by an active magnetic bearing, comprising:
   a vibration detector for detecting radial vibration of said rotary member and outputting a vibration detecting signal corresponding to the vibration;
   a compensating signal generating circuit responsive to said vibration detecting signal for generating a compensating signal having the same cycle and amplitude as a vibration component having the rotational frequency of said vibration detecting signal including:
   an amplitude detector responsive to said vibration detecting signal for detecting the amplitude of the vibration component having the rotational frequency of the vibration of said rotary member;
   a rotational cycle detector responsive to said vibration detecting signal for detecting the cycle of the vibration of said rotary member from said amplitude detecting signal;
   a pulse generator for generating pulse which have the same cycle as and are synchronized with the cycle detected by said rotational cycle detector;
   an oscillator for generating a sine wave signal which has the same cycle as and is synchronized with said pulses using said pulses as a reference signal; and
   an arithmetic unit responsive to outputs of said amplitude detector and said rotational cycle detector for outputting a signal which has the same cycle and amplitude as and is synchronized with said vibration component having the rotational frequency of said rotary member;
   a signal generating circuit for obtaining a difference between said vibration detecting signal and said compensating signal to generate a difference signal which does not include any unbalance vibration component or synchronous disturbance vibration component of said rotary member; and a control unit responsive to said difference signal for controlling the radial position of said rotary member.

7. A control system as set forth in claim 6, wherein said compensating signal generating circuit include:
an amplitude detector responsive to said vibration detecting signal for detecting the amplitude of the vibration component having the rotational frequency in the vibration of said rotary member;
a rotational cycle detector responsive to said vibration detecting signal for detecting the cycle of the vibration of said rotary member from said amplitude detecting signal;
a pulse generator for generating pulses which have the same cycle as and synchronize with the cycle detected by said rotational cycle detector;
an oscillator for generating a sine wave signal which has the same cycle as and synchronizes with said pulses using said pulses as a reference signal; and
an arithmetic unit responsive to outputs of said amplitude detector and said rotational cycle detector for outputting a signal which has the same cycle and amplitude as and synchronizes with said vibration component having the rotational frequency of said rotary member.

* * * * *